United States Patent
Crews (10) Patent No.: US 9,308,888 B2
(45) Date of Patent: *Apr. 12, 2016

(54) VEHICLE SEAT HARNESS ANCHORING SYSTEM

(71) Applicant: Shawn Paul Crews, Largo, FL (US)

(72) Inventor: Shawn Paul Crews, Largo, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/619,696

(22) Filed: Feb. 11, 2015

(65) Prior Publication Data

US 2015/0151713 A1 Jun. 4, 2015

Related U.S. Application Data

(63) Continuation of application No. 14/071,566, filed on Nov. 4, 2013, now Pat. No. 9,067,561.

(51) Int. Cl.
| | |
|---|---|
| *A47D 15/00* | (2006.01) |
| *A62B 35/00* | (2006.01) |
| *B60R 22/00* | (2006.01) |
| *B60R 22/22* | (2006.01) |
| *B60R 22/10* | (2006.01) |
| *B60R 22/26* | (2006.01) |
| *B60N 2/26* | (2006.01) |

(52) U.S. Cl.
CPC ............... *B60R 22/22* (2013.01); *B60N 2/265* (2013.01); *B60R 22/105* (2013.01); *B60R 22/26* (2013.01)

(58) Field of Classification Search
CPC ... B60N 2/2806; B60N 2/2812; B60R 22/105
USPC ......................... 297/464, 467, 484
See application file for complete search history.

(56) References Cited

U.S. PATENT DOCUMENTS

| | | | | |
|---|---|---|---|---|
| 3,301,594 A | * | 1/1967 | Pukish, Jr. ............ | B60R 22/105 297/467 X |
| 4,488,691 A | * | 12/1984 | Lorch .................... | B64D 25/02 297/484 X |
| 4,738,413 A | * | 4/1988 | Spinosa ................. | B64D 25/06 297/467 X |
| 6,547,334 B1 | * | 4/2003 | Girardin ............... | B60R 22/105 297/467 |
| 6,863,350 B1 | * | 3/2005 | McCulley ............ | B60N 2/2806 297/467 X |
| 7,673,945 B1 | * | 3/2010 | Riffel ................. | A62B 35/0025 297/467 X |
| 8,210,617 B2 | * | 7/2012 | Aaron .................. | B60N 2/2833 297/484 X |
| 8,419,127 B1 | * | 4/2013 | Wilhelm ................. | B60R 22/02 297/484 X |
| 8,794,709 B2 | * | 8/2014 | Kennedy ................. | B60R 22/10 297/467 X |
| 9,067,561 B2 | * | 6/2015 | Crews .................... | B60R 22/105 |
| 2003/0173817 A1 | * | 9/2003 | Vits ........................ | B60N 2/265 297/484 |
| 2007/0001495 A1 | * | 1/2007 | Boyle .................. | B60N 2/2806 297/484 X |
| 2007/0040441 A1 | * | 2/2007 | Boyle .................. | B60N 2/2806 297/467 |
| 2014/0042793 A1 | * | 2/2014 | Fiore .................... | B60N 2/2812 297/484 |

* cited by examiner

*Primary Examiner* — Rodney B White
(74) *Attorney, Agent, or Firm* — Tiffany C. Miller; Inventions International Inc.

(57) ABSTRACT

A vehicle seat harness anchoring system having a vehicle seat harness with straps that fit over the body of a user and fit over the legs of a user. Some of the straps are adjustable to securely hold the person in the harness. The harness anchoring system is attached to the vehicle seat harness. The harness anchoring system consists of a mixture of several fixed length and adjustable length anchoring straps. One end of the anchoring straps is either attached to an anchor plate or to an anchor point on a vehicle. The other end of the anchoring straps is attached to the vehicle seat harness.

17 Claims, 7 Drawing Sheets

VEHICLE SEAT HARNESS ANCHORING SYSTEM

CROSS REFERENCE TO RELATED APPLICATIONS

This application is a continuation application, entitled "Vehicle Seat Harness Anchoring System," which claims priority to U.S. Non-Provisional patent application Ser. No. 14/071,566 filed Nov. 4, 2013, entitled, "Vehicle Seat Harness Anchoring System."

BACKGROUND OF THE INVENTION

Field of the Invention

This invention relates, generally, to a device utilized for anchoring a person, particularly a child, to a vehicle seat.

SUMMARY OF THE INVENTION

A vehicle seat harness anchoring system is disclosed. The vehicle seat harness includes a left adjustable harness strap, a right adjustable harness strap and a chest buckle. The harness anchoring system includes an upper left anchor system strap attached to a cleat on the top of the left adjustable harness strap, an upper right anchor system strap attached to the cleat on the top of the right adjustable harness strap, an upper right adjustable anchoring strap attached to the upper left and upper right anchor system straps. An upper left anchoring strap is attached to the upper left and upper right anchor system straps and attached to the anchoring plate at the opposite end of the strap, a lower left anchoring strap attached to the bottom of the left adjustable harness strap, a lower right anchoring strap attached to the bottom of the right adjustable harness strap, and a lower middle adjustable anchoring strap attached to a lower buckle where the opposite side of the lower buckle is attached to the bottom or the left and right adjustable harness straps. Each of the upper right adjustable anchoring strap, lower left and right anchoring straps, and the lower middle adjustable anchoring straps have a free end to anchor to an anchoring plate or a vehicle anchoring point and a fixed end connected to the vehicle seat harness. The upper left anchor strap is attached to the anchoring plate.

The left adjustable harness strap and the right adjustable harness strap of the vehicle seat harness are adjustable in length. The upper left anchoring strap, the upper right anchoring strap, the lower left anchoring strap and the lower right anchoring strap of the harness anchoring system are not adjustable in length in one preferred embodiment. However, any of the straps may be made adjustable or not adjustable as is suitable for a harness that attaches and anchors in the way that the system of the preferred embodiments attaches and anchors.

When using the harness, a user places the harness anchoring system on a vehicle seat. The attached anchoring straps of the harness anchoring system are either attached to an anchor plate connected to the upper left anchoring strap, or are attached to anchoring points on a vehicle so that the harness anchoring system is secured to a vehicle seat. In use, a user sits in the harness, and the harness is secured to the user. Once adjusted, the vehicle seat harness anchoring system may remain in the vehicle seat and may be reused with minimal further adjustments. The vehicle seat harness anchoring system may also be removed at any time and transferred to another seat in the same vehicle, or to a seat in another vehicle.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
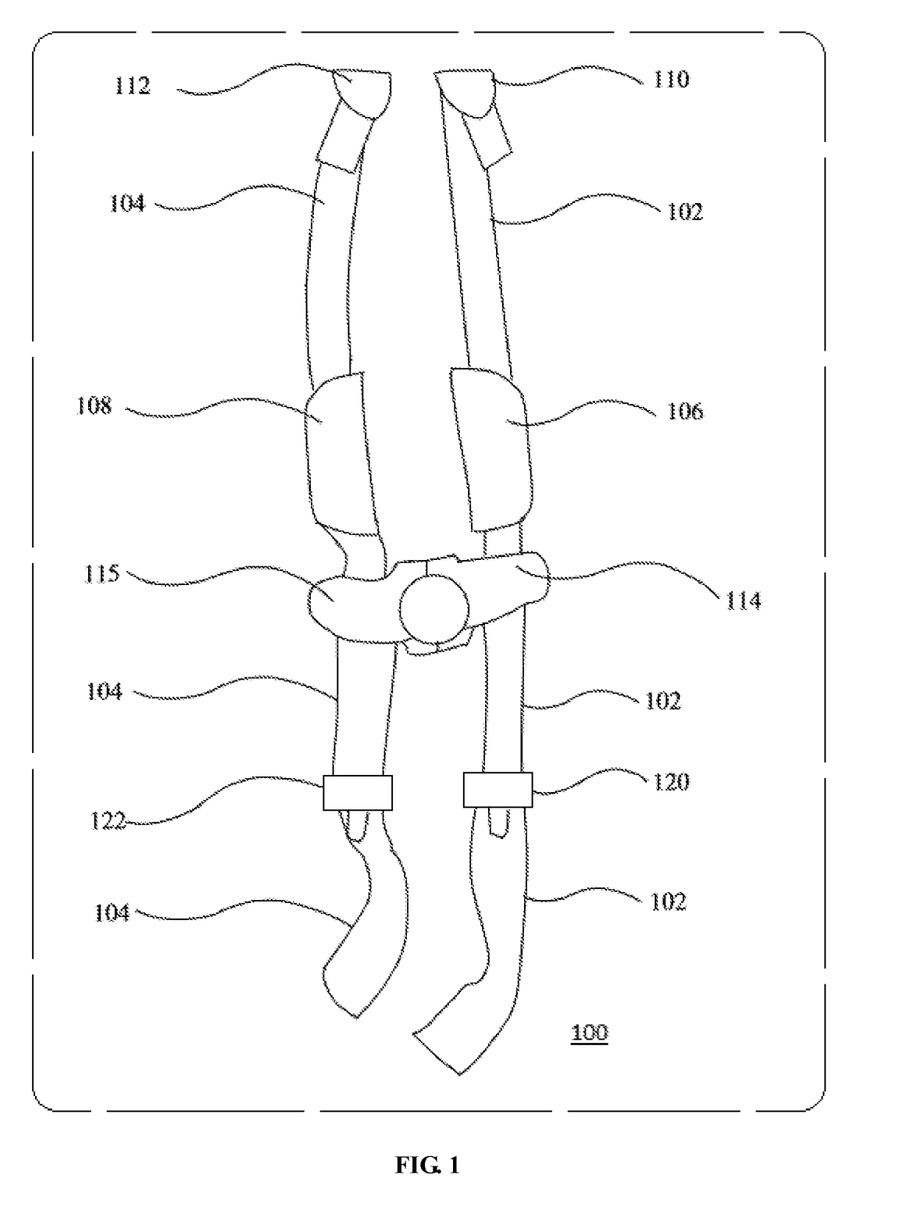
FIG. 1 is a front view of an embodiment of a vehicle seat harness, according to an implementation.
Figure 2:
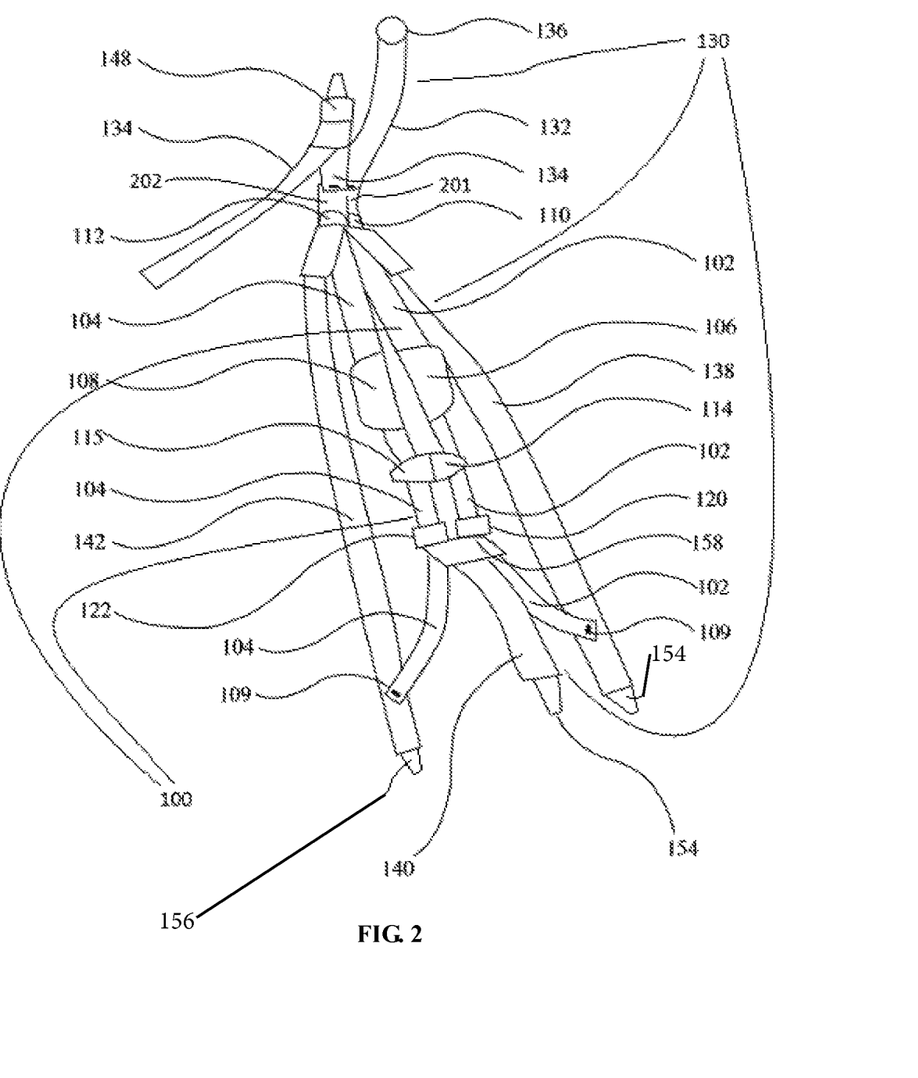
FIG. 2 is a front perspective view of one embodiment of the vehicle seat harness attached to one embodiment of a harness anchoring system, according to one implementation.

FIG. 1 is a front view of an embodiment of the vehicle seat harness 100. The vehicle seat harness 100 includes a left adjustable harness strap 102, a right adjustable harness strap 104, a left shoulder pad 106, a right shoulder pad 108, an upper left adjustable harness strap cleat 110, an upper right adjustable harness strap cleat 112, a left side of a chest buckle 114, a right side of a chest buckle 115, a lower left adjustable harness strap buckle insert 120 and a lower right adjustable harness strap buckle insert 122. The left adjustable harness strap 102 is connected to the left side chest buckle 114 and the right adjustable harness strap 104 is connected to the right side chest buckle 115. The left adjustable harness strap 102 is connected to the upper left adjustable harness strap cleat 110, which is connected to the upper left anchoring system strap 201 (FIG. 2). The right adjustable harness strap 104 is connected to the upper right adjustable harness strap cleat 112, which is connected to the upper right anchoring system strap 202 (FIG. 2). In an embodiment, the upper left adjustable harness strap cleat 110 and upper right adjustable harness strap cleat 112 are configured as "Double D-Rings". However, the invention includes, but is not limited to, a Double D-Ring.

FIG. 2 is a front perspective view of one embodiment of vehicle seat harness 100 configured to be attached to one embodiment of harness anchoring system 130. The upper portion of vehicle seat harness 100 is attached to harness anchoring system 130 by attaching an upper portion of upper left anchoring strap 132 to upper left anchoring system strap 201. Upper left anchoring system strap 201 is connected to upper left adjustable harness strap cleat 110. Lower left anchoring strap 138 is configured to be connected to upper left adjustable harness strap cleat 110.

Similarly, the upper portion of vehicle seat harness 100 is also attached to the harness anchoring system by attaching upper right adjustable anchoring strap 134 to upper right anchoring system strap 202. Upper right anchoring system strap 202 attaches to upper right adjustable harness strap cleat 112. Lower right anchoring strap 142 is adapted to be connected to upper right adjustable harness strap cleat 112. In a preferred embodiment, upper right anchoring system strap 202 and upper left anchoring system strap 201 are configured to be connected to each other, preferably by sewing. Upper right adjustable anchoring strap 134 and upper left anchoring strap 132 are configured to be connected to anchoring system straps 201 and 202. Anchoring system straps 201 and 202 may, however, attach to upper right adjustable anchoring strap 134 and upper left anchoring strap 132 in any suitable manner.

Figure 4:
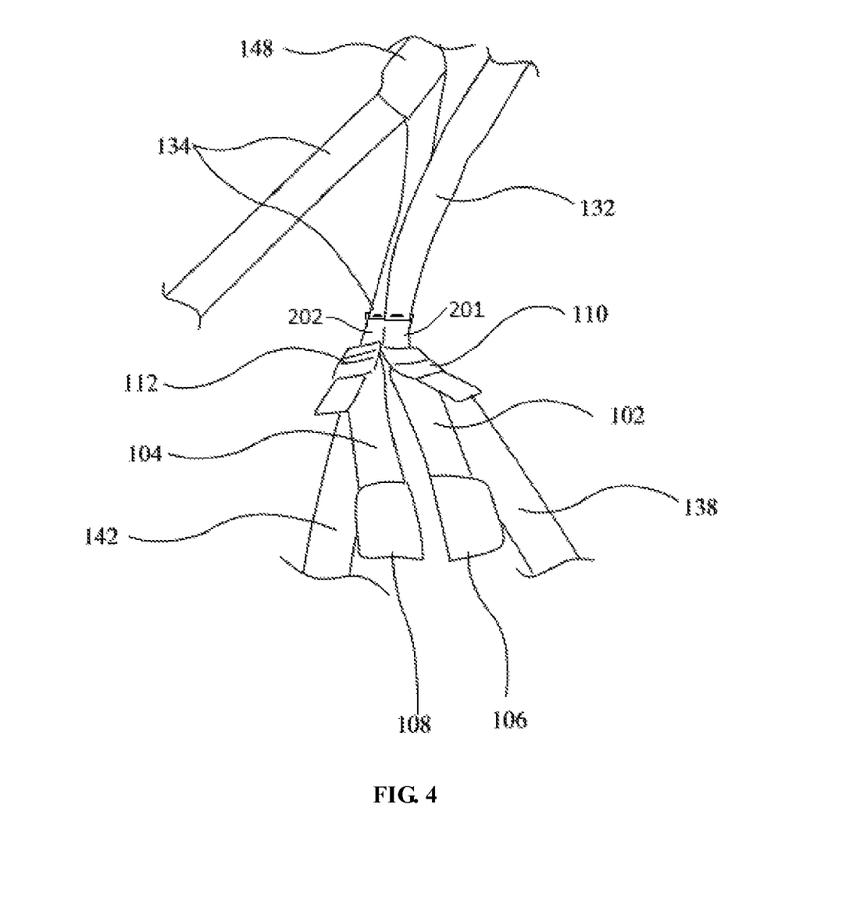
FIG. 4 is a detail view of the connection of the left adjustable harness strap and the right adjustable harness strap of the vehicle seat harness to the upper left anchoring strap, the upper right adjustable anchor strap, the lower left anchoring strap and lower right anchoring strap of the harness anchoring system from a front side of a vehicle seat before final anchoring of the anchoring system at a rear side of the vehicle seat or to vehicle anchoring points, according to an implementation.
Figure 4A:
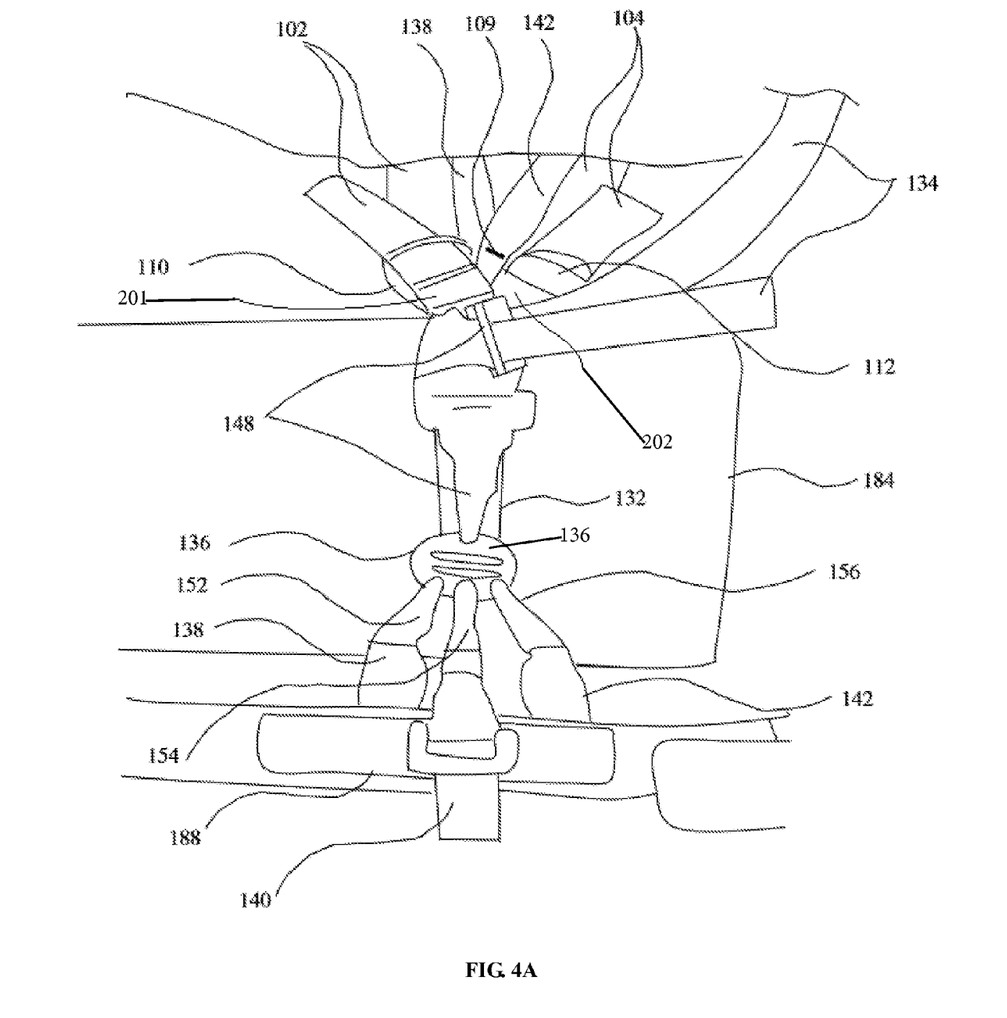
FIG. 4A is a detail view of the connection of the left adjustable harness strap and the right adjustable harness strap of the vehicle seat harness to the upper left anchoring strap, the upper right adjustable anchor strap, the lower left anchoring strap and lower right anchoring strap of the harness anchoring system from a rear side of a vehicle seat, according to another implementation.

As illustrated in FIG. 4A, the lower left anchoring strap 138 and the lower right anchoring strap 142 are connected by sewing stitches 109. As illustrated in FIG. 2, the lower portion of the vehicle seat harness 100 is attached to the harness anchoring system 130 by sewing stitches 109 to stitch a lower portion of the left adjustable harness strap 102 to the lower left anchoring strap 138 as illustrated on FIG. 2. Similarly, the lower portion of vehicle seat harness 100 is also attached to harness anchoring system 130 by sewing stitches 109 to stitch a lower portion of right adjustable harness strap 104 to lower right anchoring strap 142 as also illustrated in FIG. 2. Harness anchoring system 130 in one embodiment, has upper left anchoring strap 132 and upper right adjustable anchoring strap 134. Anchor plate 136 is attached to upper left anchoring strap 132. Harness anchoring system 130 further includes lower left anchoring strap 138, lower middle adjustable anchoring strap 140, and lower right anchoring strap 142.

Figure 8:
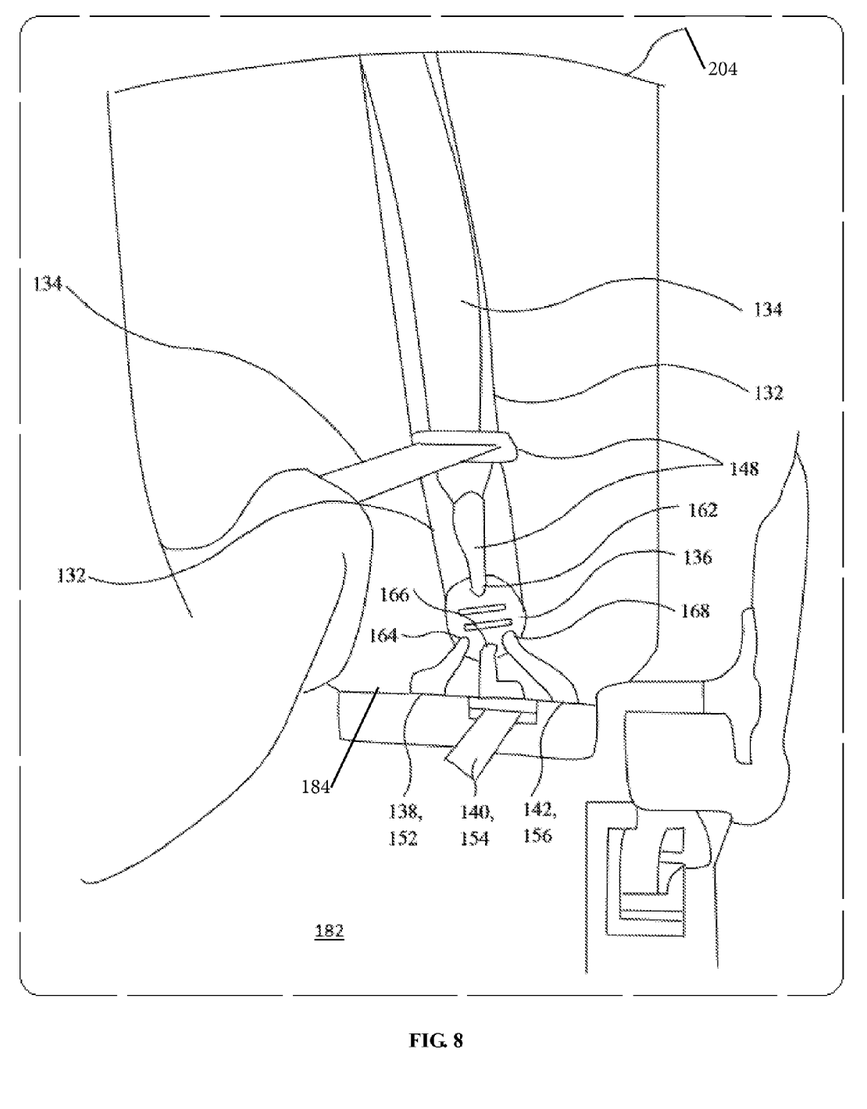

Each of the five anchoring straps (132, 134, 138, 140 and 142) has a free end and a fixed end. Attached to the free end of upper right anchoring strap 134 is anchor hook 148. Attached to the free end of lower left anchoring strap 138 is anchor hook 152. Attached to the free end of lower middle adjustment anchoring strap 140 is anchoring hook 154. Attached to the free end of lower right anchoring strap 142 is anchoring hook 156. In one embodiment, the anchoring devices 148, 152, 154 and 156 are configured as hooks (see FIGS. 6 and 6A). However, anchoring devices 148, 152, 154 and 156 are not limited to hooks and may be any suitable buckle. The free end of anchoring devices 148, 152 and 156 may be attached to anchors 188 on a vehicle seat (see FIG. 4A) or on a vehicle floor (not shown) or are attachable to anchor plate 136 attached to the upper right adjustable anchoring strap 134 when vehicle anchors are not available, or the use of the anchor plate is preferable. The free end of anchoring device 154 for lower middle adjustable anchoring strap 140 is always attached to anchor plate 136 (FIGS. 4A and 8). The fixed end of the five anchoring straps (132, 134, 138, 140 and 142) may attach to vehicle seat harness 100 by various methods.

Figure 5:
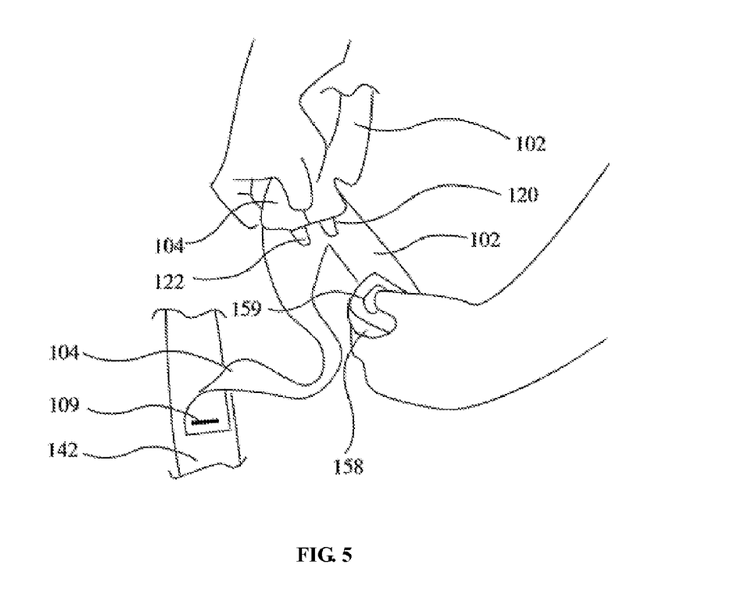
FIG. 5 is a detail view of the connection of the left adjustable harness strap and the right adjustable harness strap of the vehicle seat harness to the lower middle adjustable anchoring strap of the harness anchoring system, according to an implementation.
Figure 7:
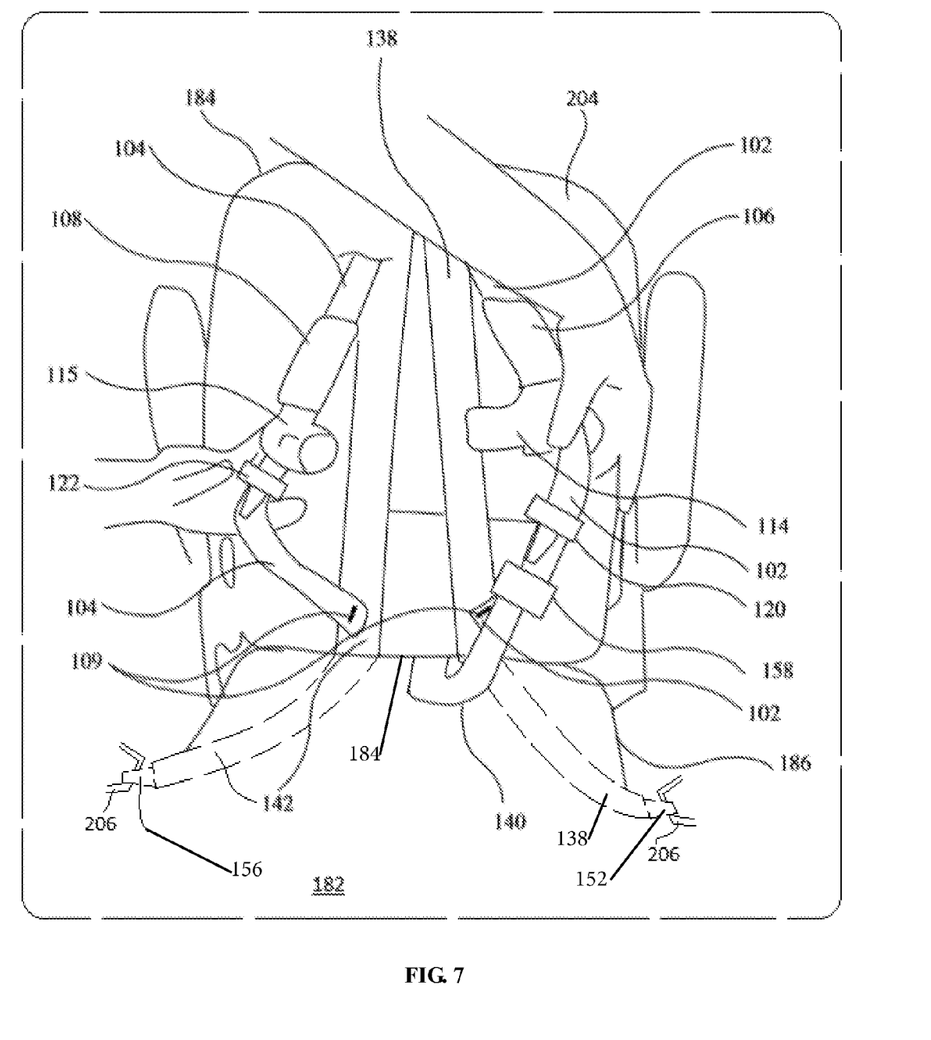
FIG. 7 is a front view of the vehicle seat harness anchoring system installed as viewed from the front side of a vehicle front seat, according to an implementation; and, FIG. 8 is a rear view of the vehicle seat harness anchoring system installed as viewed from the rear side of a vehicle front seat, according to an implementation.

In an embodiment, the fixed end of lower middle adjustable anchoring strap 140 has a two strap buckle 158 (FIGS. 5 and 7). The two strap buckle 158 is attached to lower left adjustable harness strap buckle insert 120 of left adjustable harness strap 102 and to lower right adjustable harness strap buckle insert 122 of right adjustable harness strap 104 of vehicle seat harness 100. In one embodiment, two strap buckle 158 is configured as a chest buckle. In this embodiment, left adjustable harness strap buckle insert 120 and right adjustable harness strap buckle insert 122 (FIG. 5) are configured as latches received in two strap buckle 158 configured as a chest buckle receiving two latches. However, two strap buckle 158 is not limited to a pair of chest buckles. Left adjustable harness strap buckle insert 120 and right adjustable harness strap buckle insert 122 are not limited to latches. It is within the scope of this invention for two strap buckle 158, left adjustable harness strap buckle insert 120, and right adjustable harness strap buckle insert 122 to be any suitable type of buckle.

In an embodiment, left adjustable strap buckle insert 120 and right adjustable harness strap buckle insert 122 are movable relative to left adjustable harness strap 102 and right adjustable harness strap 104, respectively. The five anchoring straps (132, 134, 138, 140 and 142) (FIG. 8) each have a free end and a fixed end. In an embodiment, the fixed end of anchoring straps 132, 134, 138 and 142 are attached to vehicle seat harness 100 by sewing a stitch 109 (FIG. 4A), to another anchoring strap 132, 134, 138 and 142, or by attachment to upper left adjustable harness strap cleat 110 or to upper right adjustable harness strap cleat 112 as discussed below in the description of FIG. 4A. The middle adjustable anchoring strap 140 is not sewn to the other four anchoring straps 132, 134, 138 and 142 in order to facilitate adjustment of the length of middle adjustable anchoring strap 140.

In one preferred embodiment, only upper right adjustable anchor strap 134 and not upper left anchor strap 132 are required to properly mount vehicle seat harness 100 in a vehicle. The harness is designed to attach to a standard vehicle seat and provide a safe harness for a child. The harness is configured to attach to a standard vehicle seat using three lower anchor straps 138, 140, 142 and at least upper right adjustable anchor strap 134, preferably by feeding three lower anchor straps 138, 140, 142 under seat back 184 (FIG. 8) of the vehicle seat, by hooking them into anchoring plate 136, and by hanging upper right adjustable anchor strap 134 over the top of seat back 204 of the vehicle seat and hooking it into anchoring plate 136. In another preferred embodiment, at least one of three lower anchor straps 138, 140, 142 can hook into at least one vehicle anchor point 206 (FIG. 7).

Figure 3:
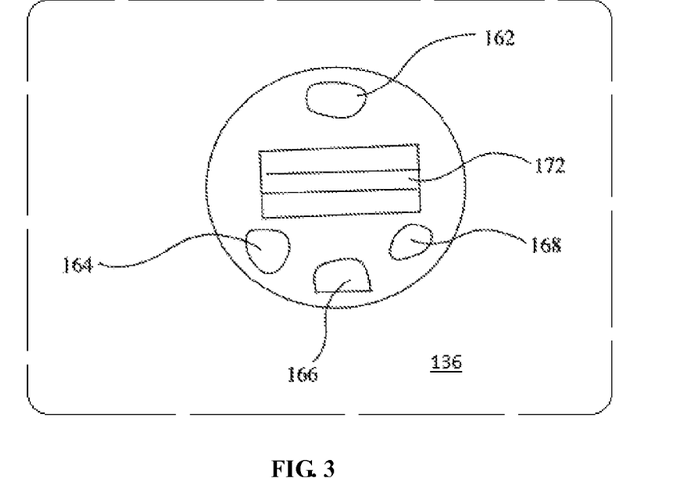
FIG. 3 is a detail view of the anchor plate which is attached to the upper left anchoring strap of the harness anchoring system, according to one implementation.

FIG. 3 is a detail view of anchor plate 136 which is always attached to upper left anchoring strap 132 (FIG. 2) of the harness anchoring system 130. As illustrated in FIG. 3, anchor plate 136 has upper receiving orifice 162 for receiving upper right adjustable anchoring strap 134 (FIG. 2) adjustable anchor hook 148 (FIG. 2). FIG. 8 illustrates anchor plate 136 also having a lower left receiving orifice 164 for receiving lower left anchoring strap 138 anchor hook 152 (FIG. 2). Anchor plate 136 additionally has lower middle receiving orifice 166 for receiving lower middle adjustable anchoring strap 140 anchoring hook 154. Anchor plate 136 further has lower right receiving orifice 168 for receiving lower right anchoring strap 142 anchoring hook 156 (FIG. 4A). Also, anchor plate 136 has a retaining bar and orifice 172 (FIG. 3) to allow anchor plate 136 to be permanently mounted on the free end of upper left anchoring strap 132 by passing a lower end of upper left anchor strap 132 through the retaining bar and orifice 172 and then stitching the upper left anchor strap so that it is secured to the retaining bar and orifice 172.

FIG. 4 is a detail view of the connection of left adjustable harness strap 102 and right adjustable harness strap 104 of vehicle seat harness 100 to upper left anchoring strap 132, upper right adjustable anchoring strap 134, lower left anchoring strap 138, and lower right anchoring strap 142 of harness anchoring system 130 from a front side of vehicle seat 182 (FIG. 7) before final anchoring of the anchoring system at a rear side of vehicle seat 182 or to vehicle anchoring points 188 (FIG. 4A). Upper left 110 and upper right 112 buckles allow left adjustable harness strap 102 and right adjustable harness strap 104 to be adjustable in length. Upper right adjustable anchoring strap 134 is made adjustable in length at another location, as detailed in FIGS. 6A and 8.

FIG. 4A is a detail view of the connection of left adjustable harness strap 102 and right adjustable harness strap 104 of vehicle seat harness 100 to upper right adjustable anchor strap 134, lower left anchoring strap 138, lower middle adjustable anchoring strap 140, and lower right anchoring strap 142 of harness anchoring system 130 from a rear side of vehicle seat 182. In an embodiment, one or both of an upper end of upper left anchoring strap 132 and an upper end of lower left anchoring strap 138 is fastened to an upper end of upper left adjustable harness strap 102 by attachment to upper left adjustable harness strap cleat 110. In this embodiment, one or both of an upper end of upper right adjustable anchoring strap 134 and an upper end of lower right anchoring strap 142 is fastened to upper left adjustable harness strap 102 by attachment to upper right adjustable harness strap cleat 112. As noted above, and as illustrated in FIG. 4A, an upper portion of lower left anchoring strap 138 and an upper portion of lower right anchoring strap 142 are connected by sewing stitches 109. In an embodiment, upper portions of one or more of anchoring straps 132, 134, 138 and 142 may also be attached to each other by sewing stitches 109. As noted above, middle adjustable anchoring strap 140 is not stitched to any other anchoring straps 132, 134, 138 and 142 and is always attached to anchor plate 136.

FIG. 5 is a detail view of the connection of left adjustable harness strap 102 and right adjustable harness strap 104 of vehicle seat harness 100 to lower middle adjustable anchoring strap 140 (FIG. 2) of harness anchoring system 130. As illustrated in FIG. 5, lower left adjustable harness strap buckle insert 120 is configured as a latch and lower right adjustable harness strap buckle insert 122 is also configured as a latch. The lower latches 120 and 122 are received into two strap buckle 158 configured as a chest buckle with release button 159. Although lower left adjustable harness strap buckle insert 120 and lower right adjustable harness strap buckle insert 122 are illustrated as latches in this embodiment, lower left adjustable harness strap buckle insert 120 and lower right adjustable harness strap buckle insert 122 are not limited to latches. It is within the scope of this invention for two strap buckle 158 to include, but not be limited to, a chest buckle. FIG. 5 also illustrates right adjustable harness strap 104 sewn by stitching 109 to lower right anchoring strap 142.

Figure 6:
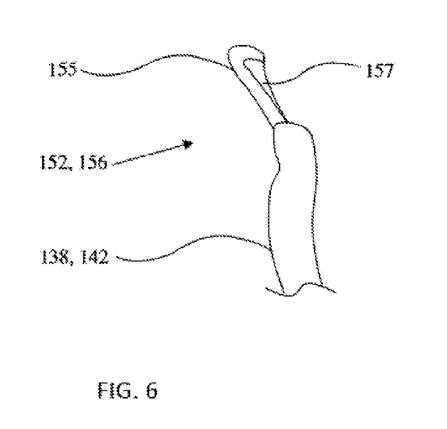
FIG. 6 is a detail view of the buckles of the non-adjustable anchoring straps, according to an implementation.
Figure 6A:
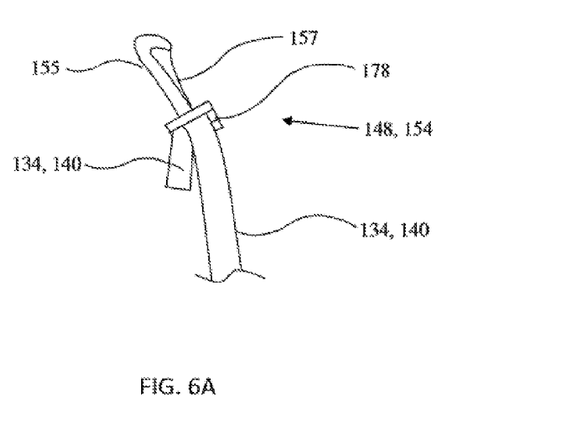
FIG. 6A is a detail view of the buckle of the adjustable anchoring straps, according to an implementation.

FIG. 6 is a detail view of buckles 152 and 156 of the non-adjustable lower left 138 and lower right 142 anchoring straps of harness anchoring system 130. As illustrated in FIG. 6, buckles 152 and 156 are configured as hooks 155 with leaf spring 157 in order to retain hooks 155 to be retained in receiving orifices 164 and 168 of anchor plate 136. FIG. 6A depicts a detail view of adjustable anchor hooks 148 and 154 of upper right adjustable anchor strap 134 and lower middle 140 adjustable anchoring strap.

As illustrated in FIG. 6A, adjustable buckles 148 and 154 are also configured as hooks 155 which are received in receiving orifices 162 and 166 of anchor plate 136 (FIG. 8). The only difference between buckles 152 and 156 for the non-adjustable straps 138 and 142 in FIG. 6 and buckles 148 and 154 for the adjustable straps 134 and 140 in FIG. 6A, is that buckles 148 and 154 in FIG. 6A also include adjuster 178, similar to those used on backpack straps in order to allow the length of the adjustable straps 134 and 140 in FIG. 6A to be adjusted. Although buckles 152 and 156 in FIG. 6 and buckles 148 and 154 in FIG. 6A are illustrated as hooks 155 in this embodiment, buckles 152 and 156 in FIG. 6 and buckles 148 and 154 in FIG. 6A are not limited to hooks 155.

FIG. 7 is a front view of vehicle seat harness 100 and harness anchoring system 130 installed as viewed from the front side of vehicle front seat 182. As illustrated in FIG. 7, lower left anchoring strap 138 and lower right anchoring strap 142 have been fed through a gap between lower portion of the seat back 184 and upper portion of the seat base 186 to a rear side of vehicle front seat 182 (FIGS. 7 and 8). FIG. 7 also illustrates left side of chest buckle 114 and right side of chest buckle 115 unbuckled, allowing for a person to fit into vehicle seat harness 100. FIG. 7 further illustrates left adjustable harness strap 102 and right adjustable harness strap 104 of vehicle seat harness 100 disconnected from lower middle adjustable anchoring strap 140 to further facilitate allowing a person to fit into vehicle seat harness 100.

As also illustrated in FIG. 7, lower middle adjustable anchoring strap 140 is additionally fed through the gap between seat back 184 and seat base 186. Feeding anchoring straps 138, 140 and 142 through the gap at bottom of seat back 184 facilitates keeping anchoring straps 138, 140 and 142 and vehicle seat harness 100 flush and snug to vehicle seat 182. Vehicle seat harness 100 and anchoring system 130 are illustrated in FIG. 7 as being installed in a "bucket" type front seat 182. However, vehicle seat harness 100 and anchoring system 130 may be installed on any vehicle seat. In the case of a back seat of an automobile sedan, access to the trunk area of the automobile and slots available or cutout in the rear deck may be required for installation of vehicle seat harness 100 and anchoring system 130 in the back seat of an automobile sedan.

FIG. 8 is a rear view of vehicle seat harness 100 and harness anchoring system 130 installed as viewed from the rear side of vehicle front seat 182. As illustrated in FIG. 8, upper left anchoring strap 132 with attached anchoring plate 136 and upper right adjustable anchoring strap 134 descend downward from the top of seat back 204. Adjustable anchor hook 148 for upper right adjustable anchoring strap 134 is configured to be inserted into anchor plate 136 upper receiving orifice 162. As also illustrated in FIG. 8, lower left anchoring strap 138, lower middle adjustable anchoring strap 140, and lower right anchoring strap 142 have been fed under seat back 184 to the rear of vehicle front seat 182. Anchor hook 152 for lower left anchoring strap 138 has been inserted into anchor plate 136 lower left receiving orifice 164. Anchoring hook 154 for lower middle adjustable anchoring strap 140 has been inserted into anchor plate 136 lower middle receiving orifice 166. Anchoring hook 156 for lower right anchoring strap 142 has been inserted into anchor plate 136 lower right receiving orifice 168.

FIG. 8 further illustrates a user (not shown) adjusting the length of upper right adjustable anchoring strap 134 to facilitate secure anchoring of harness anchoring system 130 to vehicle front seat 182. The length of lower middle adjustable anchoring strap 140 may also be adjusted to facilitate secure anchoring of harness anchoring system 130 to vehicle front seat 182. If anchoring locations are available proximal front seat 182 in FIG. 8, some, or all of anchoring straps 134, 138 and 142 may be anchored to the vehicle anchoring locations instead of anchor plate 136 attached to upper left anchoring strap 132.

In use of the embodiments of FIGS. 1-8, a user (not shown) locates-vehicle seat harness 100 and harness anchoring system 130 at a desired seat in a vehicle. The user then feeds upper left anchoring strap 132 and upper right adjustable anchoring strap 134 over the top of seat back 204 to the rear of the seat. The user next feeds lower left anchoring strap 138, lower middle adjustable anchoring strap 140, and lower right anchoring strap 142 in a gap between the seat back 184 and vehicle seat base 186 to the rear of the seat. The user then connects buckles 148, 152, 154 and 156 for anchoring straps 134, 138, 140 and 142, respectively, to receiving orifices 162, 164, 166 and 168, respectively, on anchor plate 136. As noted above, the user may anchor some (FIG. 4A), or all of buckles 148, 152 and 156 for anchoring straps 134, 138 and 142, respectively, to appropriate anchor points proximal the vehicle seat. As noted above, anchoring hook 154 for lower middle adjustable anchoring strap 140 is always connected to anchoring plate 136.

After the anchoring straps 134, 138, 140 and 142 have been anchored to the vehicle, or the anchor plate 136, the length of the upper right adjustable anchoring strap 134 and/or the lower middle adjustable anchoring strap 140 is adjusted so that harness anchoring system 130 is securely anchored to any vehicle seat. Once harness anchoring system 130 is securely anchored to the vehicle seat, left side chest buckle 114 is unbuckled from right side chest buckle 115 and lower left adjustable harness strap buckle insert 120 and lower right adjustable harness strap buckle insert 122 are disconnected from two strap buckle 158 located on the lower middle adjustable anchoring strap 140. The user, who is generally a child, then sits on vehicle seat harness 100. Once the user (not shown) is seated in place, lower left adjustable harness strap buckle insert 120 and lower right adjustable harness strap buckle insert 122 are then reconnected to two strap buckle 158 on lower middle adjustable anchoring strap 140 and left side chest buckle 114 is then chest buckled to right side chest buckle 115.

Left adjustable harness strap 102 and right adjustable harness strap 104 are then tightened as necessary so that the person is secured within vehicle seat harness 100. After the person is secured in vehicle seat harness 100, some adjusting of upper right adjustable anchoring strap 134 or lower middle adjustable anchoring strap 140 may be necessary for the person's comfort and safety. For the user to be released from vehicle seat harness 100, left side chest buckle 114 is unbuckled from right side chest buckle 115 and lower left adjustable harness strap buckle insert 120 and lower right adjustable harness strap buckle insert 122 are disconnected from two strap buckle 158, allowing the user to be free of restraint from vehicle seat harness 100. Once installed, vehicle seat harness 100 and harness anchoring system 130 may remain installed as long as desired, or may be removed at any time and relocated to another seat, or another vehicle. After the first use and adjustment, subsequent uses of vehicle seat harness 100 and harness anchoring system 130 should require only minimal time and effort.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall there between.

Now that the invention has been described,

The invention claimed is:

1. A vehicle restraint system, comprising:
   a securing plate, said securing plate having a plurality of openings;
   at least one pliable member having a first end located opposite a second end, whereby, said first end of said at least one pliable member is retained by a retaining bar connected to said securing plate;
   a portion of said at least one pliable member traversing over an upper portion of a backrest, whereby, said securing plate is positioned on a first side of said backrest of a vehicle seat, whereby said backrest having a first side located opposite a second side;
   a portion of said at least one pliable member traversing through a lower portion of said backrest, whereby, said portion of said at least one pliable member connected to at least one opening of said securing plate, thereby, securing said at least one pliable member to said securing plate; and,
   a harness, said harness connected to a portion of said at least one pliable member, said harness configured to restrain an occupant to said vehicle seat.

2. The vehicle restraint system of claim 1, wherein said at least one pliable member has at least one end connected to a fastener.

3. The vehicle restraint system of claim 1, wherein said at least one pliable member is configured to be adjustable in length.

4. The vehicle restraint system of claim 1, wherein said harness having a portion of said harness configured to traverse through said lower portion of said backrest, whereby, an end of said portion of said harness is connected to at least one opening of said securing plate, thereby, securing said portion of said harness to said securing plate.

5. A vehicle restraint system, comprising:
   a securing plate, said securing plate having a plurality of openings;
   a first pliable member, said first pliable member having a first end located opposite a second end, whereby, said first end of said at least one pliable member is retained by a retaining bar connected to said securing plate;
   a portion of said first pliable member traversing over an upper portion of a backrest of a vehicle seat, whereby, said securing plate is positioned on a first side of said backrest, whereby said backrest having a first side located opposite a second side;
   a portion of said first pliable member traversing through a lower portion of said backrest, whereby, said second end of said first pliable member connected to at least one opening of said securing plate, thereby, securing said first pliable member to said securing plate; and,
   a harness, said harness is connected to a portion of said first pliable member, said harness is configured to restrain an occupant to said vehicle seat.

6. The vehicle restraint system of claim 5, wherein said harness is connected to a portion of a second pliable member.

7. The vehicle restraint system of claim 5, wherein said vehicle restraint system having a second pliable member, said second pliable member having a first end located opposite a second end, whereby, a portion of said second pliable member traversing over said upper portion of said backrest, said first end of said second pliable member connected to at least one opening of said securing plate.

8. The vehicle restraint system of claim 7, wherein a portion of said second pliable member traversing through said lower portion of said backrest, whereby, said second end of said second pliable member connected to at least one opening of said securing plate, thereby, securing said second pliable member to said securing plate.

9. The vehicle restraint system of claim 5, wherein a portion of said second pliable member is connected to a portion of said first pliable member.

10. The vehicle restraint system of claim 5, wherein at least one pliable member has at least one end connected to a fastener.

11. The vehicle restraint system of claim 5, wherein at least one pliable member is configured to be adjustable in length.

12. The vehicle restraint system of claim 5, wherein said harness having an end configured to traverse through said lower portion of said backrest, whereby, said end of said harness connected to at least one opening of said securing plate, thereby, securing a portion of said harness to said securing plate.

13. A vehicle restraint system, comprising:
 a securing plate, said securing plate having a plurality of openings;
 a first pliable member, said first pliable member having a first end located opposite a second end, whereby, said first end of said at least one pliable member is retained by a retaining bar connected to said securing plate;
 a harness, said harness connected to a portion of said first pliable member, said harness configured to restrain an occupant to said vehicle seat, said harness having an end configured to traverse through a lower portion of a backrest of said vehicle seat, whereby, said end of said harness is connected to at least one opening of said securing plate;
 a portion of said first pliable member traversing over an upper portion of said backrest, whereby, said securing plate is positioned on a first side of said backrest, whereby, said backrest having a first side located opposite a second side;
 a portion of said first pliable member traversing through a lower portion of said backrest, whereby, said second end of said first pliable member is connected to a first anchor of a vehicle, thereby, securing said first pliable member to said first anchor;
 a second pliable member, said second pliable member having a first end located opposite a second end, whereby, a portion of said second pliable member traversing over an upper portion of said backrest, said first end of said second pliable member is connected to a second anchor of said vehicle; and,
 said second end of said second pliable member traversing through a lower portion of said backrest, whereby, said second end of said second pliable member is connected to a third anchor of said vehicle.

14. The vehicle restraint system of claim 13, wherein said harness is connected to a portion of said second pliable member.

15. The vehicle restraint system of claim 13, wherein a portion of said second pliable member is connected to a portion of said first pliable member.

16. The vehicle restraint system of claim 13, wherein at least one pliable member has at least one end connected to a fastener.

17. The vehicle restraint system of claim 13, wherein at least one pliable member is configured to be adjustable in length.

* * * * *